United States Patent
Tcheng

(10) Patent No.: US 11,068,939 B1
(45) Date of Patent: Jul. 20, 2021

(54) NEURAL NETWORK FOR OPTIMIZING DISPLAY OF HOTELS ON A USER INTERFACE

(71) Applicant: GBT Travel Services UK Limited, London (GB)

(72) Inventor: Christophe Tcheng, London (GB)

(73) Assignee: GBT TRAVEL SERVICES UK LIMITED, London (GB)

( * ) Notice: Subject to any disclaimer, the term of this patent is extended or adjusted under 35 U.S.C. 154(b) by 486 days.

(21) Appl. No.: 15/964,830

(22) Filed: Apr. 27, 2018

(51) Int. Cl.
*G06Q 30/02* (2012.01)
*G06N 3/04* (2006.01)
*G06N 3/08* (2006.01)

(52) U.S. Cl.
CPC .......... *G06Q 30/0261* (2013.01); *G06N 3/04* (2013.01); *G06N 3/08* (2013.01)

(58) Field of Classification Search
CPC .............. G06Q 30/02; G06Q 30/0255; G06Q 30/0269; G06Q 30/0247; G06Q 30/0267; G06Q 30/0261; G06Q 30/0631; G06Q 30/0275; G06Q 30/0243; G06Q 30/0282; G06Q 30/0207–0277; G06Q 10/10; G06Q 50/01; G06Q 30/0201; G06Q 30/0278; G06Q 40/025; G06Q 40/08; G06Q 20/405; G06Q 30/018; G06Q 50/18; G06Q 50/26; G06Q 10/0639; G06Q 2220/18; G06Q 30/0206; G06Q 30/0208; G06Q 30/0215; G06Q 40/04; G06Q 50/188; G06N 20/00; G06N 3/08; G06N 3/02; G06N 3/04; G06N 5/04; G06N 3/0454; G06N 3/0427; G06N 3/084; G06N 20/20; G06N 3/0481; G06N 3/082; G06N 5/046; G06F 16/9535; G06F 16/27; G06F 16/2379; G06F 9/543; G06F 9/466; G06K 9/6268; G06K 9/6215; G06K 9/6218; G06K 9/6256; G06K 9/6262; G06K 9/6257; G06K 9/6267; H04L 2209/38;

(Continued)

(56) References Cited

U.S. PATENT DOCUMENTS 6,782,375 B2 * 8/2004 Abdel-Moneim ....... G06N 3/02
706/46
2007/0288641 A1 12/2007 Lee et al.
(Continued)

OTHER PUBLICATIONS

Corazza et al., An Artificial Neural Network-based technique for on-line hotel booking, Science Direct.com, Emerging Markets Queries in Finance and Business 2013—EMQFB2013 (Year: 2014).*

(Continued)

*Primary Examiner* — Chinyere Mpamugo
(74) *Attorney, Agent, or Firm* — K&L Gates LLP

(57) ABSTRACT

A system and computer-implemented method is provided for a neural network for the optimal display of hotels on a graphical user interface. Computation is undertaken on a dataset wherein combinatorial complexity is reduced by obtaining a metric that can be a subset of a larger universe of user displays. A desired result set is obtained that can improve traveller satisfaction, travel agent revenues, and overall utility. This is accomplished by computing a first combination of displays, weighted as appropriate, and obtaining the results of an expression defined by factoring in a probability to sell a hotel based on a selected display on a user interface.

1 Claim, 8 Drawing Sheets

(58) Field of Classification Search
CPC . H04L 9/3239; H04L 2209/56; H04L 9/0637;
G16Y 10/50; G16Y 40/10
See application file for complete search history.

(56) References Cited

U.S. PATENT DOCUMENTS

| | | |
|---|---|---|
| 2008/0147484 A1 | 6/2008 | Davis |
| 2014/0310072 A1 | 10/2014 | Wojciechowski |
| 2016/0117587 A1 | 4/2016 | Yan et al. |

OTHER PUBLICATIONS

Zhao et al., "Sales Forecast in E-commerce using Convolutional Neural Network", Aug. 26, 2017, https://arxiv.org/pdf/1708.07946. pdf, 8 pages.
Nedelec et al., "Content2Vec: Specializing Joint Representations of Product Images and Text for The Task of Product Recommendation", ICLR 2017 conference submission, 13 pages.
Lang et al., "Understanding Consumer Behavior with Recurrent Neural Networks", Int. Workshop on Machine Learning Methods for Recommender Systems, MLRec, 2017, 8 pages.

* cited by examiner

| Traveller | Hotels Displayed | | | Past Purchase Decision | | | Expected Obj. Points |
| --- | --- | --- | --- | --- | --- | --- | --- |
| | Value Inn | Comfortable Hotels | Premium Suites | Value Inn | Comfortable Hotels | Premium Suites | |
| John | X | X | | 30% | 50% | 20% | 4.8 |
| John | X | X | X | 10% | 20% | 70% | 8.1 |
| John | X | | X | 5% | 10% | 85% | 9.05 |
| Robert | X | | | 20% | 80% | | 4.2 |
| Robert | | X | X | | 95% | 5% | 5.25 |
| Robert | X | X | | 50% | 30% | 20% | 4 |
| Linda | X | X | | 60% | 30% | 10% | 3.1 |
| Linda | | X | X | 30% | 60% | 10% | 4.3 |
| Linda | X | | X | 80% | 5% | 15% | 2.55 |
| Objective | | | | 1 | 5 | 10 | |

FIG. 3

| Traveller | TO SELL THIS HOTEL | DISPLAY THESE HOTELS | | |
|---|---|---|---|---|
| | | Value Inn | Comfortable Hotels | Premium Suites |
| John | Value Inn | X (451) | X (452) | X (453) |
| John | Comfortable Hotels | X | X | |
| John | Premium Suites | X | | X |
| Robert | Value Inn | X | | X |
| Robert | Comfortable Hotels | | X | X |
| Robert | Premium Suites | X | | X |
| Linda | Value Inn | X | X | X |
| Linda | Comfortable Hotels | | | X |
| Linda | Premium Suites | | | X |
| Objective | | 1 (431) | 5 (432) | 10 (433) |
| Overall historic sales % | | 20% (441) | 50% (443) | 30% (444) |

FIG. 4

| Sale # 520 | Input (traveller, hotel) 521 | Output (display) 522 |
|---|---|---|
| 1 530 | John, Premium Suites 531 | Value Inn, Comfortable Hotels 432 |
| 2 540 | Linda, Value Inn 541 | Comfortable Hotels, Premium Suites 542 |
| 3 550 | Robert, Comfortable Hotels 551 | Value Inn, Premium Suites 552 |

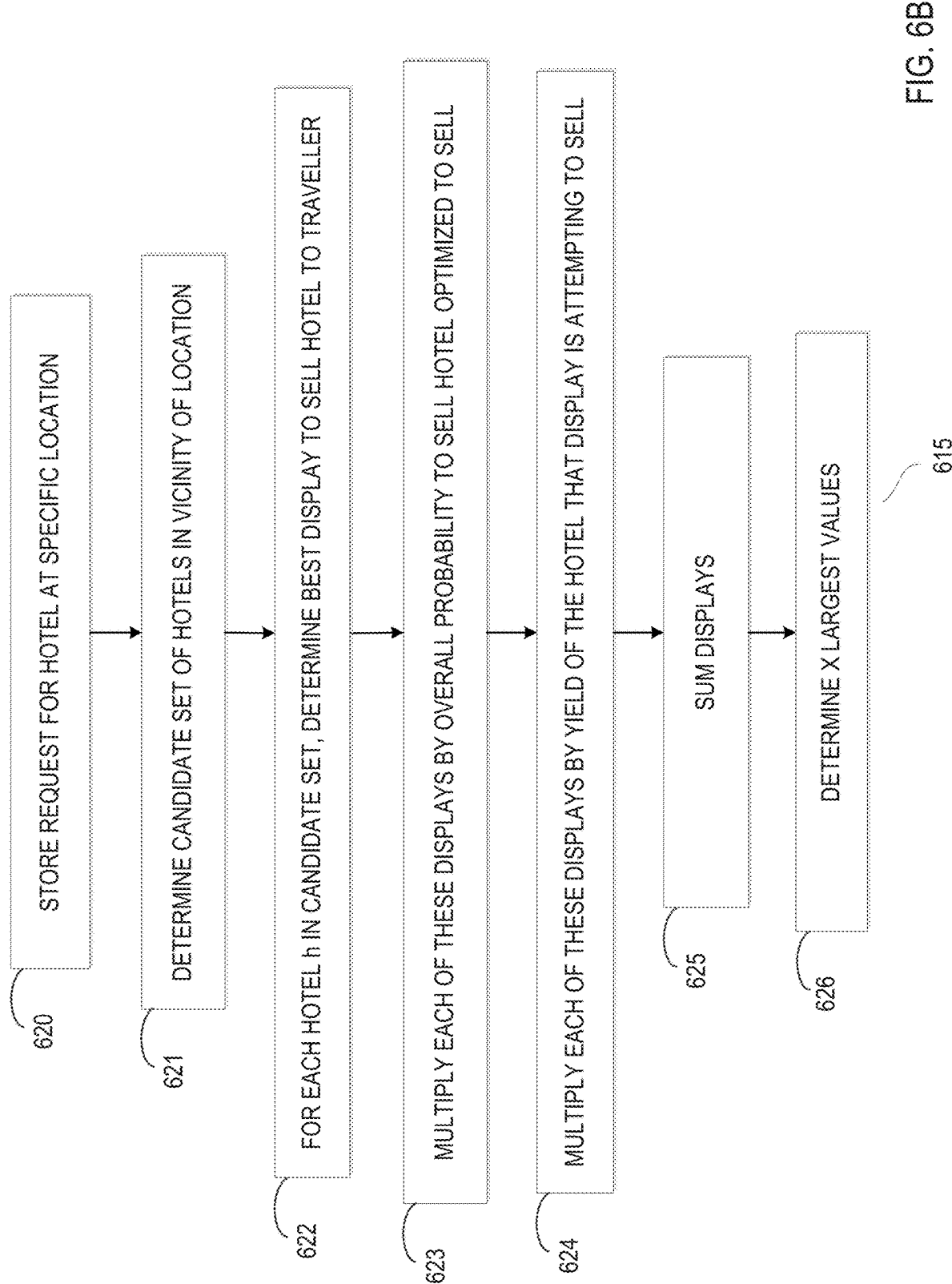

NEURAL NETWORK FOR OPTIMIZING DISPLAY OF HOTELS ON A USER INTERFACE

BACKGROUND

Optimally configuring the parameters by which hotels are displayed on a user interface in the making of a hotel reservation can benefit the traveller, the travel agent, and the hotel content aggregator. Such configuration takes into account many considerations, each with a unique but potentially significant impact on the ultimate determination at hand, i.e., where is the traveller going to stay? A consideration of relevance to the traveller is his or her own preferences, e.g., favourite hotel brand, proximity to a business meeting, and loyalty or reward points. Further, a consideration of relevance to the travel agent can be traveller satisfaction, and also compensation from the various hotels or other business partners. Still more, a consideration of relevance to the hotel content aggregator, if there is one in connection with the transaction, can be differential compensation provided for reservations from different hotels. Price is a factor for all, with differing points of emphasis. All of the foregoing parties have an interest in obtaining superior results, both to enable the traveller to have a pleasant hotel stay based on the booking, but also, on a broader basis, to continue to generate and maintain a dependable stream of future income.

For business travel in particular, the foregoing parties can have multiple roles. The travel agent can have an interest in addressing individual travel preferences of multiple employees from one company, and also in containing overall travel spend by the company. A hotel content aggregator may have a business partnership with a travel agent. Other roles are implemented, each adding a layer of complexity.

Methods are known for taking into account interrelationships in hotel booking in accord with the foregoing. Rules may be applied, such as revenue managers and rules engines. One such approach is A/B testing, where two versions of a web page are provided and statistics gathered on user response, and successive versions can be refined on a comparative basis, with the goal of maximizing revenue, user engagement, and/or other goals.

Further, traveler preferences and historical decision-making can play a role as well. Relevant factors include but are not limited to room cost, reputation of the hotel brand, services provided at the hotel, proximity to desired activities at the destination, and loyalty or reward points, Thus, as a threshold matter, configuring the display properties for offering hotels on a user interface can improve revenue yield and thereby benefit hotel content aggregators (not to mention hotel providers themselves), and benefit travel agencies conducting business travel. In addition, the configuration can benefit the travelers themselves by implementing their preferences, and can take into account past preferences and future desires by the individual traveler, as well as on a more collective basis such as a company client for a travel agency specializing in business travel. Accordingly, taken as a collective, in whole or in part, there are multiple considerations that might be considered utility metrics, which can determine an optimal display of hotels on a user interface, where such utility can be measured on the part of the traveller, the corporate client, the travel agent, and/or the hotel aggregator.

DRAWINGS

FIG. 3 is an example dataset illustrating hotel purchasing decisions.

FIG. 4 is an example dataset illustrating revealed traveler preferences in light of objective measures and overall historic sales percentage.

FIG. 5 illustrates an example matrix showing variables subject to prediction.

FIG. 6B is a flowchart showing a mechanism for determining a combination of hotel displays that can provide the greatest expected benefit.

SUMMARY OF THE INVENTION

In embodiments are presented a system and computer-implemented method for a neural network for the optimal display of hotels on a user interface.

DETAILED DESCRIPTION

Reference will now be made in detail to several non-limiting embodiments, including embodiments showing example implementations. The figures depict example embodiments of the disclosed systems, and/or methods of use for purposes of illustration only. One skilled in the art will readily recognize from the following description that alternative example embodiments of the systems and methods illustrated herein may be employed without departing from the principles described herein.

Figure 1:
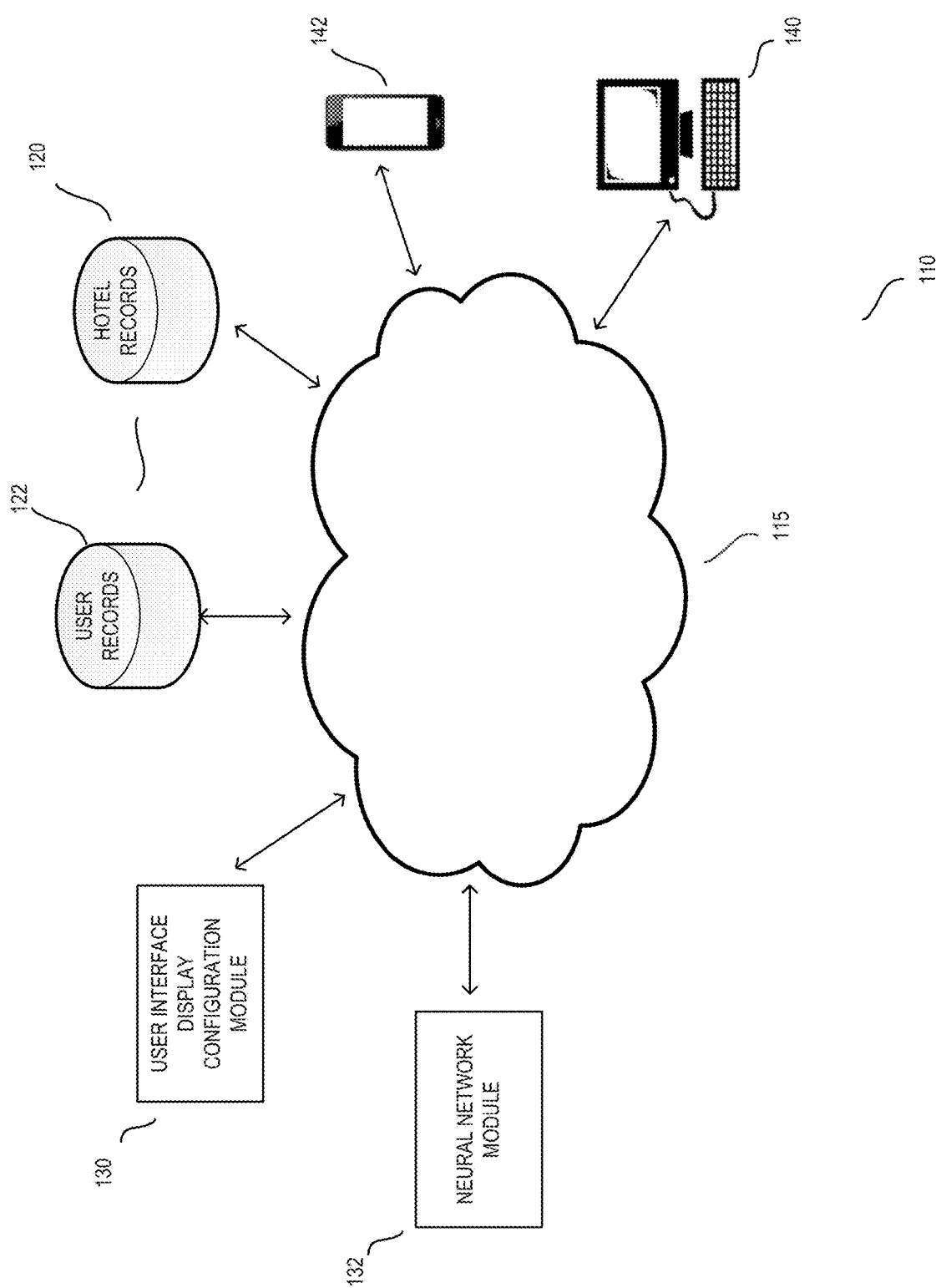
FIG. 1 illustrates one embodiment of an architecture and computing environment for a neural network for the optimal display of hotels on a user interface.

FIG. 1 can illustrate a computing environment 110 for assisting with configuring a display for a neural network for the optimal display of hotels. User-interface display configuration module 130, which can be logically and/or physically associated with one or more servers and/or processors, can be operatively associated with a hotel record database 120 and user record database 122, as by a network 115. Network 115 can represent a network of any logical or physical size such as a broad network such as the Internet, and can represent a small one such as a LAN or hyperlocal network, it being understood that a network enables communication of data from one computing device to another. User interface display configuration server 130 can be operatively associated with a computer(s), input device(s) and display(s) 140, 142. Computer, input device and display (s) 140, 142 (wherein the foregoing can be singular or plural) can contain or be operatively associated with a processor(s), and with memory(ies) and can include software applications. Computer, input device and display 140, 142 can comprise a personal computer, a laptop, a tablet, a mobile device such as a smart phone, smart glasses, or a smart watch; it will be appreciated that any device containing, or in operative association with, a processor(s) and a memory(ies) can serve the purpose of computer and input device(s) 140, 142. As noted, UI display configuration module 130 can be in operative communication with a network 115. Network 115 can permit operative communication of the foregoing functionalities with added devices, functionalities and modules.

Neural network module 132, which can be logically and/or physically associated with one or more servers and/or processors, can comprise and/or be in operative communication with computational functionality to implement an architecture for carrying out the system and method herein by a neural network. The capabilities thereof can be implemented as suitable by one or more of software, firmware, and hardware.

It is understood that some or all of the foregoing functionalities can be in operative communication via one or more communications networks, wired or wireless. Each of the foregoing functionalities can be controlled by mechanism of software or firmware instructions embodied in a non-transitory computer medium.

Figure 2:
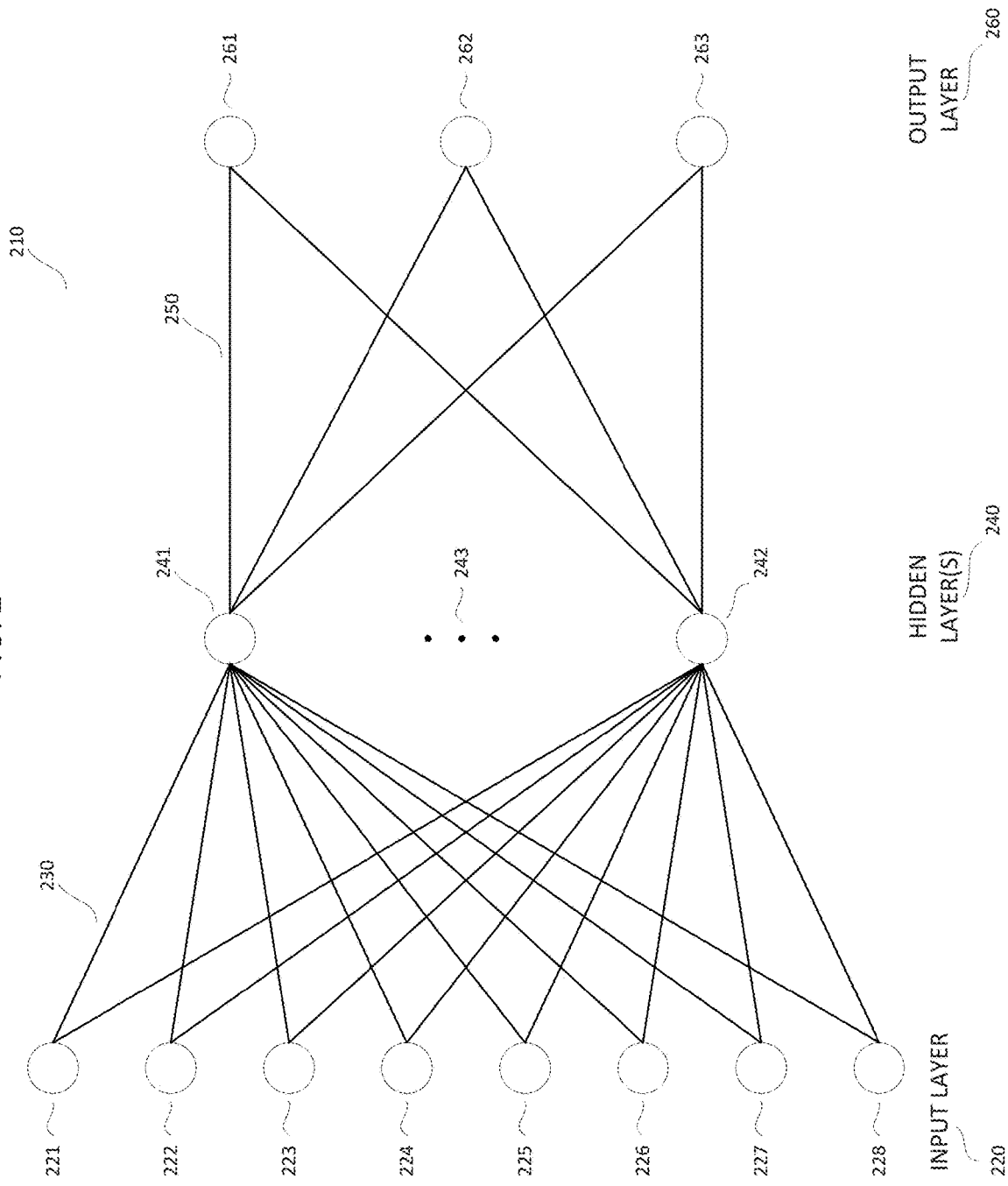
FIG. 2 illustrates one embodiment of a neural network for the optimal display of hotels on a user interface.

FIG. 2 illustrates one embodiment of a neural network for configuring a display to optimize display of hotels on a computer interface. A neural network is a specialized network configuration that can facilitate connections among neurons. Each neuron can be associated with a value. The pathways between and among neurons can likewise be associated with a value.

Based on complex computations, the system implementing a neural network can make accurate determinations of properties and relationships based on tremendous amounts of data of highly varying levels of granularity, provide new or improved models and understandings of data, and predict future behavior by components and subcomponents of the neural network, whether the components or subcomponents are individuals and groups on the one hand, processor-based machines on the other hand, or a combination of some or all of the foregoing.

Two phases can be employed. A first phase is the training phase, wherein the neural network learns based on history, e.g., past data. Many thousands or millions of examples can be embedded in the training set. The neural network can learn by adjusting weights and biases, and other parameters, in the network. A second phase can be using the trained network to predict current or future data. An example configuration of a neural network can establish thresholds above or below which individual neurons do or do not "fire", e.g., pass on to another neuron a given value, a modified value, or no value. Such thresholds can take a number of values within a range. These thresholds can change for a single neuron, and not infrequently many or all neurons, during the course of iterating through a computing session. A neuron can be associated with a value or property—or, put another way, a function. As but one example, if a sum of weighted inputs into a neuron exceeds a value, then a neuron can transmit an output—a signal—to a next layer.

In an example embodiment, layers of neurons can be provided. There can be an input layer 220 with a certain amount of neurons. Values can be inserted into all or some of these neurons. The value in each neuron can be passed to all or some of additional neurons in an added layer. In an example embodiment there can be at least one "hidden" layer 240. A hidden layer can take the value from the input layer 220 and subject it to processing. Although one hidden layer is shown in FIG. 2, there can be multiple hidden layers. At a certain point in processing, values in the hidden layer 240 can be communicated to an output layer 260.

Neurons 221-228 are illustrated in the input layer of an example embodiment. There can be more or fewer input neurons. A pathway or connection 230 can be made between a single neuron 221 in one layer with a neuron 241 of another layer. In the hidden layer 240 illustrated herein, two neurons are shown 241, 242. However, there may be added neurons 243 in the hidden layer. There may be multiple hidden layers. Further, there can be a connection between a neuron 241 of the hidden layer with a neuron in the output layer 261. Neurons in the output layer herein are shown at 261, 262 and 263. There can be fewer or more neurons in the output layer. Pathways or connections can be made in many ways from one neuron to another, from one layer to another.

The invention herein can be implemented by a convolutional neural network (CNN), a recurrent neural network (RNN), or other combination or type of neural network.

In other words, a neuron can be represented by a node, and data can flow via a pathway or connection from one interconnected neuron to another neuron. The values, properties, or functions passed forward in this respect can be understood as signals. The system can thus propagate input signals to output signals. The operations herein can be understood and accomplished as vector operations.

One of skill in the art can appreciate that there are a number of transfer functions that can be used, which can also be considered activation functions. One is a sigmoid function. Although not limited to them, a sigmoid function can be used in output layers. Similarly, a softmax function can be used in output layers. Values from this function can range from −1 to +1 for one set of functions thereof. Additionally, the range can be set from 0 to +1, 0 to infinity, or another range. Input neurons can thus pass signals forward to nodes in one or more hidden layers, which then pass values to an output layer. And, as will be discussed below, the values in the output layer can backpropagate to added layers. Backpropagation can be used during the training phase. An activation function can help manage the values passed through the neural network to facilitate processing through a certain desired range of values.

Additional functions can be used, such as ReLU, or Rectified Linear Unit. In an example embodiment, a softmax function can be used that can emphasize certain values. A softmax function can take as input a vector of x values and output a vector that amplifies the highest value(s) in the vector, and decreases other values. Different functions can be used depending on desired functionalities, and architectural location (e.g., an output layer may be associated with a softmax function, and a hidden layer a ReLU function).

An activation function can take on multiple computational meanings. An example meaning is the decision whether to pass on a signal, the decision based on whether a threshold has been met. Given that the value of a neuron can be considered a function of a weighted sum of all its inputs, which can include a bias, an activation function can be applied to the foregoing value to transform it to a further value. Numerical values that can be assigned to an activation function can take several forms and ranges, and can vary depending on the state of iterations, depth at which the neural network is designed to operate, and results desired.

A weight can be given a value that is passing forward. This weight can reflect a given strength or relative "importance" of a value associated with the connection, such as a computed "cost", accuracy of data or relationships, or other desired parameter. Weights can be shared by neurons, such as those logically grouped together based on a function. Weights can be associated with the pathway or connection between one neuron and another.

An additional value, known as a bias, can also be taken into account when storing a value in a successive layer. A bias can reflect, for example, a tendency for a neuron to be considered active or inactive, such assignment performed to enhance the chances that the values stored in a given neuron are meaningful.

Mechanisms for passing a value from one layer to another can include matrix multiplication. Computing thusly can yield vector matrix products. These products can be processed, as described above, by certain functions such as a sigmoid or other function by which for example to obtain results within a certain range. Added matrix operations can be used.

At a certain point, values can reach the output layer 260. These values can be checked against actual, expected, predicted or otherwise postulated values, and a difference in value computed thereby. Results from this difference can be propagated in a backward fashion, to and/or through one or more layers, to approximate a cost function, such as by computing partial derivatives of parameters taking into account weights and biases.

There can be a higher "cost" when the neural network makes relatively more "mistakes", i.e., deviations from an actual, expected, predicted or otherwise postulated value. There can be a lower cost when it is more accurate. Further, the cost function can vary based on the weights and biases applied. It is not just the magnitude of the cost function that can be relevant but its rate of change. The cost function's rate of change—i.e., how "quickly" it changes as a computational matter—can be relevant and help refine the overall mechanism of the neural network.

A goal, then, of "training" the neural network is to find a set of weights and biases that reduce and may minimize the cost function. Put another way, training a network can change the network's overall behaviour in such a way that enhances understanding of existing data relationships, reveals new ones, and obtains the foregoing with an increasing degree of accuracy.

Obtaining the cost function can be implemented in multiple ways. One way is gradient descent. Gradient descent can be understood as where a cost function descends toward minima of a given function(s), Gradient descent has been likened, in visual terms, to traversing down a "three-dimensional" valley of varied rises and dips toward a low point. This low point can be considered a local minimum for the cost function. However, a substantial amount of complexity can be managed. Gradient descent can take into account systems with several, hundreds, thousands or more dimensions, by among other things employing vector computations reflecting these dimensions. Gradient descent, although broadly used, is one of a kind of optimization algorithm that can be used herein. An "optimization algorithm" Is one that can minimize an error function or other objective function. Minimizing the function can iteratively adjust weights and biases of nodes to improve accuracy. Additional optimization algorithms can include, broadly put, first order and second order optimization algorithms.

One of skill in the art will therefore appreciate that lowering or minimizing the cost function is one mechanism by which—given for example multiple iterations—the neural network can learn properties of the data therein, can reveal relationships among the data, and can predict outputs given selected inputs. Computers are capable, of course, of solving complex problems requiring substantial computation. These functionalities can be obtained by conventional programming. However, a computer can be employed for adaptive properties based on "learning" to solve problems. Such learning can represent presenting selected inputs to the system, representing certain parameters, and then adjusting the parameters, such as by applying selected weights to values, and can include a bias, which can iteratively refine more accurate solutions. In this respect, the system can also make predictions.

During the learning process, a training dataset can be fed into the network. The training set can have known values and parameters, and as such the cost function, and iterative lowering thereof, can be more readily understood and manipulated by the system. Further, a testing dataset can be employed after the training data has initially been employed, in order to test the performance and accuracy of the neural network, and to adjust and fine-tune it as desired.

One such neural network can be considered a feedforward network, wherein input is propagated as each neuron receives a weighted sum of multiple inputs. The determination of this choice and related ones can occur during the learning process. Again, it should be appreciated that an artificial neural network of a kind implementing the teachings herein can be a recurrent neural network, and/or have properties that enable operations to proceed in some combination of forward, backward, looping and/or other manner.

One of skill in the art will appreciate that multiple computer languages, packages thereof and scripts can be used to implement a neural network. Instrumentalities for use herein can be found in and associated with Python, Java, C++, C#, Lisp, Prolog, R and others.

Further, one of skill in the art will appreciate that the neural network disclosed herein can take multiple architectures, modalities, and implementations. Systems and methods disclosed herein can also be facilitated by multiple interconnected neural networks, and additional network configurations.

Parameters by which the neural network can perform computations by which to optimize display of a hotel on a graphical user interface are now provided, as well as a discussion of datasets and their properties given multiple individuals, and from the perspective of a single individual.

In an example embodiment, a hotel can be numbered from 0 to H−1. A hotel can be represented as a one-hot encoded vector, with zeroes everywhere except for the one hotel represented. Accordingly, a hotel h with number n can be represented as $$h=\{h_i; h_n=1, h_i=0 \text{ if } i \neq n\}$$

Further, the encoded vector can be s-hot. In other words, s hotels can be provided. Such hotels can be stored in vectors. The vectors can be, for example, 1,000,000 "ones" or "zeroes" representing a display of s hotels. Where s=5, five of these elements can be ones, and the remaining 999,995 zeroes. The above can bear analogy to the "bag of words" approach in artificial intelligence and natural language processing. Herein, a "bag of hotels" can be provided. If not implemented in this manner, there can be a vector of 5,000,000 ones or zeroes, and the first hotel displayed represented in elements 1-1,000,000, second hotel from U.S. Pat. Nos. 1,000,001, 2,000,000, and so on. An additional mechanism for representing s-hot vectors is that a first hotel can be represented 100, a second 010, and a third 001. S-hot mechanisms can be used "offline" in training, or "online" during calculation of the best combinations of hotels where a traveler selects a desired hotel vicinity.

The hotel attachment rate can be taken into account through a parameter that can represent a hotel that is "declined". This can represent the fact that a user declined to choose a hotel on this platform.

A display of S hotels can be represented as an S-hot encoded vector, without consideration for ordering, e.g.:

$$s=\{s_i; s_d=1 \text{ if hotel } d \text{ is displayed}, s_i=0 \text{ otherwise}\}$$

Y can be an objective function, i.e., a function mapping hotels to a quantified objective. $Y(h) \in \mathbb{R}$, where $\mathbb{R}$ is the set of all real numbers. The objective could be an employer preference. Other objective functions can comprise commission paid by hotels, but could be an objective function to be maximized, such as corporate negotiated value or channel shift.

R can be a request, which can combine two parameters: the user and the request itself. The user can be represented with various attributes such as his or her company, location, or behaviour. The request can consist of the destination and date, but could include added attributes such as: Is hotel a 4-star/5-star hotel? Does the hotel room have WiFi & breakfast? Many added parameters can be employed, corresponding to among other things: a user and his or her preferences and purchasing history; a hotel and properties associated with it; a travel management company and/or individual travel agent, and preferences thereof. There can be metaparameters, comprising newly understood parameters based on combination of two or more of the above.

P'(h,r) is the overall probability to sell h, averaged over all displays. P(h,d,r) is the probability to sell hotel h when the user is presented with display d.

In an embodiment, an objective is to maximize the expected (probabilistic) objective function. In other words, it is to find the display to maximize $\mathbb{E}(Y)$ $$\mathbb{E}(Y) = \sum_{h \in H} P(d, h) \cdot Y(h)$$

Suppose the system has a list of 3 hotels to display: H1, H2, H3. The display d consists of H1 and H3. It will be appreciated that even if H2 is not present on the display it is possible that it is sold; the user could find other ways to buy H2. Suppose that when the request r comes in (request r being composed of some or all of the user, the channel, the location and any useful parameter), the probability is 20% to sell H1, 30% to sell H2 and 50% to sell H3. Finally, suppose that the objective for H1 is 1, Y(H2)=3, and Y(H3)=10. The expectation for Y, averaged over all probabilities is as follows:

$$\mathbb{E}(Y, r) = P(d, H1, r) * Y(H1) P(d, H2, r) * Y(H2) + P(d, H3, r) * Y(H3)$$

$$\mathbb{E}(Y, r) = 20\% * Y(H1) + 30\% * Y(H2) + 50\% * Y(H3)$$

$$\mathbb{E}(Y, r) = 20\% * 1 + 30\% * 3 + 50\% * 10$$

$$\mathbb{E}(Y, r) = 6.1$$

The system can implement a function F that creates an optimal display for each request, so that d=F(r).

In order to so, F (or rather elements of F) can be modelled with a neural network parametrized by θ: d=F(r; θ). θ are the weights in the network that can be optimized using deep learning techniques comparable to those discussed herein.

The implementation can be rewritten to find the parameters θ that maximize the $\mathbb{E}(Y)$. Additionally, θ=argmax$_\theta$ $\mathbb{E}(Y)$=argmax$_\theta$ $\mathbb{E}(F(r; \theta))$.

By way of non-limiting illustration, an example embodiment is shown herein. A neural network can learn what display on a user interface can lead to selling hotel h for request r.

An input layer can comprise H and R neurons. Thus, by way of non-limiting example, neurons 221-223 can comprise H neurons which represent hotels. Neurons 224-226 can represent request parameters (city, point of sale, customer ID, length of stay, title of traveller, corporate division (such as sales or support) etc.) An output layer can have H neurons, representing the display. An activated neuron in the output layer creates a signal for a hotel to be displayed. As can be appreciated, an activation level can be assigned above which a hotel is displayed, and below which it is not.

A suitable architecture for the neural network 210 can take into account structure (connectivity), activation functions, and number of neurons. In an example embodiment, sigmoid activations can be used with 30-50 neurons in the hidden layer. This can appropriately embed and classify the input layer.

The neural network 210 can be presented a training set composed of a large number of past experiences, such as {hotel sold, request}→{display} and it can be trained to optimize weights. Suitable methods to optimize can take into account an appropriate cost function (cross-entropy, mean square error, maximum likelihood, etc.), algorithm (back-propagation variants), and regularization function. Once trained, the network can predict efficiently. For example, as an output, the neural network can predict a display that can be used to sell each hotel. The display may be, but does not need to be, five-encoded. A suitable mechanism to compute the five-hot encoded representation of the display can be implemented. It should be noted that the display may have five hotels, or more hotels, or fewer hotels, depending on desired results. A max function can be used, i.e., taking the number of elements from the output with the highest value. For purposes of illustration only, this quantity may be set as five, but may be more or fewer. Again, FIG. 2, is meant to be illustrative and not limiting; three elements in the output layer 260 are shown for illustrative purposes.

Configured accordingly, the neural network can be represented as a function d=N(h,r)

An optimal display can thereby be determined. Depending on the circumstances, "optimal" can mean a single best state, a single best grouping of states, or be interpreted to mean favorable when compared to another state or grouping of states. Based on request r, a list C of candidate hotels can be determined. This can be done by listing a number of hotels in the vicinity of a requested point. For instance, if request r includes geolocation, it can be done by listing, for example, 1,000 hotels closest to the requested geolocation. For hotels h in C, a predicted optimal display N(h,r) can be determined.

Truncation and normalization to N(h,r) can be applied to yield enhanced results. kmax is a function that transforms a vector into another vector whereby the top k values are transformed into 1.0 and all other values are zero. In other words, it selects the top k hotels from the output of the neural network. An optimal display d' can be determined wherein:

$$d' = \sum_{h \in C} P'(h) Y(h) \max(N(h, r))$$

From d', the top S signals can be selected. These can be the elements of a certain magnitude or threshold in the vector d' to produce the optimal display d.

It will be noted that the neural network disclosed herein can determine a strategy to sell a first hotel brand, combine it with a strategy to sell a second hotel brand, and a third brand, etc., and sum these predictions to obtain an optimal display as by a weighted sum. The order of combinations presented is not paramount under embodiments herein. Further, objective values can be taken into consideration such as an expected objective point value. It will be understood that an optimal display of hotels on a user interface can be provided. It will also be understood that the commodities for display can comprise those beyond the field of accommodations, to commodities provided for optimal display on a user interface that have parameters that can be configured in accord with the teachings herein.

By way of non-limiting example, an illustration is provided herein with three travellers from the same company who often travel to a particular office location. There are three hotels offered via a graphical user interface to the traveller, to one or more personnel at a travel management company, or to one or more personnel at a travel agency.

Value Inn is a two-star independent hotel, not part of any chain, and has no loyalty card or reward. Comfortable Hotels is a three-star hotel, and offers breakfast. It is a standard business hotel. Premium Suites is a 4-star hotel, with rewards for business travellers. There are three travellers in a company under current consideration, John, Robert, and Linda, whoJohnRobertLinda have certain personas and preferences.

In an embodiment, the display in the preferred online booking tool has two slots. In other words, only two hotels can be presented on a given display. In other words, in this s-hot display s=2. Of course, John, Linda or Robert can click on the next page to look for other options, or scroll down, or actuate a link, and then a list of hotels will be presented. It will be appreciated that the teachings herein can be extended to a neural network that can output more than two slots in a display.

One of skill knows that there are many parameters that affect the choices of travellers. These include, for example, that a dinner is organized close to the Premium Suites, John and Robert travel together for a joint meeting at their office location, loyalty rewards play a role, distance from hotel to meeting location is considered, etc. These many variables may influence the purchasing decision of the three travellers to a greater or lesser degree. From a system and prediction perspective, they may appear as random choices, but are motivated by real-world criteria. Price is also a parameter, but may not completely drive the decision.

FIG. 3 provides an example dataset 310 comprising hotel purchasing decisions based on hotels displayed, over the course of 12 months, and the variable impact on revenue yield. FIG. 3 can be accomplished during a training stage of the neural network. Data is provided on three travellers 320: John 321, Robert 322, and Linda 323. These past purchase decisions can comprise past purchase preferences of the travellers. Of course, one of skill in the art will appreciate that there may be tens, hundreds or thousands of travellers, and the dataset could expand accordingly and be treated appropriately. So too with the period from which data is gathered. It can be twelve months, or represent a larger or smaller time period of variable increments.

It will also be appreciated that employer preference can be a factor. For example, the employer may have a "standard" hotel, which can be varied based on certain factors. Employer preference may be assigned a score. Value Inn satisfies employer preference 371 equivalent to a quantitative factor of 1 unit, a decision for Comfortable Hotels satisfies employer preference 372 equivalent to 5 units, and a decision for Premium Suites satisfies employer preference 373 equivalent to 10 units. These may be considered an objective 370 of the travel management company or agent, or other party, in the sense that decision-making behaviour in making a booking at a given hotel can satisfy quantified employer preference based on the above scores. Additional objective measures 370 can include financial compensation or other consideration for making a booking, offering items in a package, or any other metric partially or wholly susceptible to objective treatment.

To obtain the dataset 310, data is gathered on the selections of John, Robert and Linda when presented with display options on a user interface. The display options herein are presented as a permutation of three hotels where two are presented at one time. The three hotels herein are Value Inn, 331, Comfortable Hotels 332, and Premium Suites 333. However, added hotels may of course be used. The two hotels are presented on a display on a user interface such as a monitor, mobile device, glasses, watch, or other mechanism of processor-based display. Other forms of presentation are possible, including voice-recognition units such as smart speakers (e.g., Alexa). Teachings herein can be adjusted accordingly to correspond to primacy or latency in providing information to a user, i.e., data generated by whether a user decision is made when different options are presented including by analyzing position of an offering in a sequence of offerings prior to the making of a hotel booking decision.

In presenting the two hotels on a user interface, the display can show the options adjacent to each other in a vertical relationship, horizontal relationship, or other relationship. Different colors, designs, and display effects may be used. In fact, the manner of display itself can be an input that furnishes added information under the invention. In other words, the composition, method of rendering, and many other parameters associated with a graphical user interface can be considered in computations in accord with the disclosures herein.

Past purchasing decisions 350 can indicate that when John is presented a display that includes the combination 340 of Value Inn and Comfortable Hotels, during a 12-month period he selects Value Inn 351 30% of the time 360. During this period, he selects Comfortable Hotels 352 50% of the time 361. And, even though it is not an option displayed on the example screen that shows Value Inn and Comfortable Hotels only for purposes of this illustration, he selects Premium Suites 20% of the time 353. Again, it should be appreciated that the data herein can be obtained over a time period other than a 12-month period, that the time periods may not be identical for each traveller, or another permutation is used.

Expected objective points 380 are now discussed. Employer satisfaction can be measured in units by a travel management company (TMC), travel agency or individual travel agent based on the purchase decision. For the 30% of the time that John chooses Value Inn in this scenario, based on employer satisfaction metrics this yields an expected 0.3 objective points. This is because 30% multiplied by an objective unit amount of 1=0.3. For the 50% of the time that John chooses Comfortable Hotels, based on employer satisfaction metrics this yields 2.5 objective points. This is because 50% multiplied by an objective unit amount of 5=2.5. For the 20% of the time that John chooses Premium Suites, based on employer satisfaction metrics this yields an expected 2.0 objective points. This is because 20% multiplied by an objective unit amount of 10=2.5. When summed, 0.3+2.5+2.0=4.8 expected objective points 381.

Computing based on the same parameters for the combination presented to John comprising Comfortable Hotels and Premium Suites 341, there would be 8.1 expected objective points 382, again based on multiplying the probability based on a past purchasing decision 351, 352, 353 by the corresponding objective points associated therewith 371, 372, 373. Finally, computing based on the same parameters for the combination presented to John comprising Value Inn and Premium Suites 341, there would be 9.05 expected objective points 383.

Accordingly, it will be seen that the combination providing the maximum expected objective points 380 for John 321 is that combination comprising Value Inn and Premium Suites 342. To highlight its being the maximum resulting from three combinations, the value showing the 9.05 points 383 is bolded.

A similar computation is made for Robert 322, where his choices provide 4.2, 5.25, and 4.0 expected objective points respectively, as seen correspondingly at 384, 385, 386. The maximum value of 5.25 is again bolded 385.

Further, a similar computation is made for Linda 322, where her choices provide 3.1, 4.3 and 2.55 expected objective points respectively, as seen correspondingly at 387, 388, 389. The maximum value of 4.3 is bolded 388.

Based on the computations described herein, John is predisposed to booking the Premium Suites, and there is a higher chance to sell Comfortable Hotels to him in a combination 340 where the Premium Suites is not displayed. Even so, based on past purchasing decisions of John, to maximize the chance that he will select the Premium Suites, it is desirable to display it with Value Inn 331. Based on the values of dataset 310, there is a relatively lower chance to influence John to decide on Value Inn.

It can also be seen that Robert is likely to book the Comfortable Hotels as a significant preference, and a mechanism to create an even better chance he will select Comfortable Hotels is to avoid showing the Value Inn.

Linda's preferences are more nuanced, but she will favour the Value Inn or Comfortable Hotels, and Premium Suites as a third choice.

Based on computational results, and the assumption that future behavior can be wholly or partially predicted based on past results, it can maximize revenue where John is concerned to display Value Inn and Premium Suites.

An added filter can be used based on multiple individuals. For example, for this set of three individuals, displaying the combination Comfortable Hotels and Premium Suites yields the highest number of objective points. In other words, the sum of expected objective points for John, Robert and Linda for the combination Value Inn and Comfortable Hotels yields 12.1 EOP. The sum of EOP for the combination Comfortable Hotels and Premium Suites yields 17.65 EOP. The sum of EOP for the combination Value Inn and Premium Suites yields 15.6 EOP. Thus, it can be seen that EOP for an individual can present a different environment than for a group. In other words, yield-maximizing based on John's revealed preferences suggests displaying Value Inn and Premium Suites; yield maximizing based on a the group of three individuals' revealed preferences suggests displaying Comfortable Hotels and Premium Suites. It should be noted that there can be many factors involved.

For purposes of illustration, scenarios with three individuals have been shown, and permutations computed based on their associated data as an individual and as a group. It will become clear that the level of combinatorial complexity can increase exponentially due to the conceivably large number of hotels, displays, requests and users (not to mention other parameters). In a sample data universe, there can be more than one million hotels, with two million possibilities of five hotels out of fifty. There are thousands of companies and millions of travellers. And finally there are thousands of requests if consideration is made of clusters of geolocation only, millions if additional parameters are considered such as cost, star rating, company preferences, etc., and so on.

It will be appreciated that there can be added users and hotels in the input layer 220, represented in FIG. 2 by neurons 227 and 228. There can be one or more hidden layers 240. There can be added neurons in the output layer 260 representing additional potential outputs.

It should be noted that the output may be in a form that is not simply a binary display of two hotels—e.g., a form wherein Value Inn is not merely equal to 1, Comfortable Hotels=0, Premium Suites=1—but rather a non-binary display such as Value Inn=0.8, Comfortable Hotels=0.2, Premium Suites=0.9. Another way of viewing this matter is to state that activation levels may be different depending on the circumstances. The sum may not necessarily equal one but a truncation and normalization can be applied.

FIG. 4 is an example dataset illustrating revealed traveler preferences in light of objective measures, and overall historic sales percentage. To obtain an EOP, an operation can be performed such as averaging probabilities. Added variables presented include the overall historic sales percentage, which reflects the percentage sales of the three hotels. In other words, if there are x amount of hotel decisions made for these three hotels sold, Value Inn sales can comprise 0.2x, Comfortable Hotels 0.5x, and Premium Suites 0.3x. This may be for a given number of three travellers, such as John, Robert and Linda, of for millions of travellers.

For instance, with respect to John, and taking into consideration results from FIG. 3, the display to sell Value Inn can be computed to be the combination of Value Inn and Comfortable Hotels. That is, the highest value, in percent terms, for past sales of Value Inn to John for a predetermined period is 30%, seen at 360. This value is associated with the user-interface display combination Value Inn-Comfortable Hotels. Now, factoring in that the objective (compensation factor) for Value Inn is 1 (item 431), and it is known that the overall historic sales percentage is 20% (item 441), then the system assigns a value for the display as the product of the overall historic sales multiplied by the objective. It will also be appreciated that the overall historic sales percentage 470 can be used and may be set as an equivalent amount of expected future historic sales percentage. In other words, past numbers may be used on a one-to-one basis to predict future sales. However, the numbers may not reflect a unity, and other factors may be employed. For purposes of this example embodiment, historic sales can be expressed as an equivalent probability of future sales.

In light of the above, to sell Value Inn to John, Value Inn 451 and Comfortable Hotels 452 are displayed. For Value Inn, a historic sales percentage 441 multiplied by the objective points 431 equals 0.2. For Comfortable Hotels, in addition, this value also equals 0.2, as it is displayed on the same page in the Value Inn-Comfortable Hotels pairing. Further, the value for Premium Suites 453 equals zero, because it is not in this computation a valid result for this scenario. It will be understood that scenarios can exist where Premium Suites is factored in accordingly with a non-zero value. In short, the values obtained to sell Value Inn to John are 0.2 Value Inn, 0.2 Comfortable Hotels, and 0.0 Premium Suites.

Further, the display most likely to sell Comfortable Hotels to John is the pairing of Value Inn and Comfortable Hotels on a display. Here, multiplying the probability to sell Comfortable Hotels 443 (50%) times the objective 432 (5) yields the product 2.5. Again, Premium Suites is assigned a value of zero. In short, the values obtained are 2.5 Value Inn, 2.5 Comfortable Hotels, and 0.0 Premium Suites.

In addition, the display most likely to sell Premium Suites to John is the pairing of Value Inn and Premium Suites on a display. Here, multiplying the probability 444 (30%) times the objective (10) yields the product 3.0. Here, Comfortable Hotels is assigned a value of zero. In short, the values obtained are 3.0 Value Inn, 0.0 Comfortable Hotels, and 3.0 Premium Suites.

Now, the system can sum the individual displays. The resulting values are: 5.7 Value Inn, 2.7 Comfortable Hotels, and 3.0 Premium Suites. In other words, for John, the display to maximize objective points is Value Inn and Premium Suites, because these values (5.7 and 3.0 respectively) exceed the value for Comfortable Hotels (2.7). These computations can be obtained for Robert and Linda in like fashion.

The system can predict a hotel to recommend that maximizes expected benefits. FIG. 5 shows an example matrix of variables for prediction. There are three sales 520. There is an input of (traveller, hotel) 521 and an output 522 (display). For John, the highest EOP 383 is associated with Premium Suites, as reflected in 531. In this regard, Value Inn and Comfortable Hotels can be displayed. Here the output could be Value Inn and Comfortable Hotels on the display. Likewise, for Robert, the highest EOP is associated with Comfortable Hotels 385. In this regard, Value Inn and Premium Suites can be used on the display. It has to be noted that the display maximizing EOP may not be the most likely to sell, neither be present at all in the display. That is because the EOP takes into consideration many parameters. In embodiments, there can be one input neuron per traveller (or per company of which traveller is employee), one input per hotel, and one output per hotel.

Figure 6A:
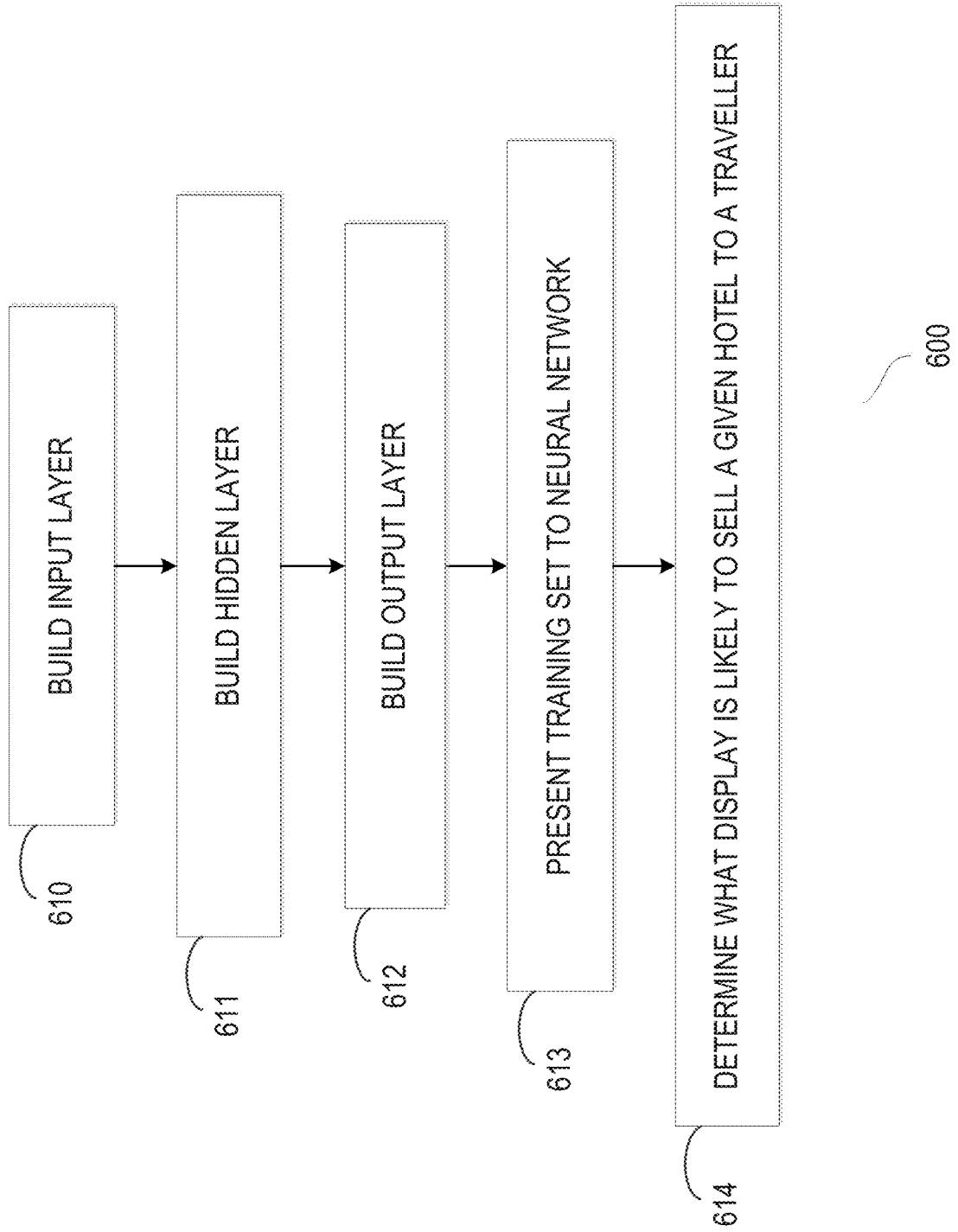
FIG. 6A is a flowchart showing a mechanism for determining a combination of hotel displays that can provide the greatest expected benefit.

FIG. 6A is an example mechanism for optimizing the display of hotels with a neural network. A neural network is built 600. This can happen offline, for example once per day. In building the neural network, the displays of which lead to selling hotel h to traveller t, an input layer is built 610. The input layer can comprise H and T neurons. H neurons represent hotels, and T neurons represent known parameters from a traveller. In embodiments, other parameters can be provided for input neurons besides a traveller neuron, such as city, point of sale, customer ID, length of stay, title of traveller, corporate division and others. Further, a hidden layer can be built 611. In embodiments, there can be multiple hidden layers, and different connectivity and structure. Further, an output layer can be built 612. The input layer can comprise a hotel and traveller, and an output layer can comprise a display. The output layer can comprise H neurons, representing the display. Multiple embodiments of structure (connectivity), activation functions and number of neurons can be used. In embodiments, an example neural network can use sigmoid activations using a small number of neurons in the first hidden layer, such as 30-50, as these neurons can embed and classify the input layer. The hidden structure of the neural network can take many forms. An activated neuron in the output layer can signal a hotel that can be displayed. A training set of a number of past experiences can be presented to the neural network 613. Such functions can include {hotel sold, traveler}→{display}. The network can be trained to optimize weights. Options for optimizing can be related to the cost function (cross-entropy, mean square error, maximum likelihood and others), as well as for the algorithm (back-propagation variants and regularization function and others). Further, the neural network can determine what display is likely to sell each hotel to each traveler. The output can be a vector of values between zero and one (as is with a sigmoid). By configuration of the network, the number of activations close to one can correspond based on a predetermined function to as many hotels as determined for the display.

FIG. 6B is an example mechanism for optimizing the display of hotels with a neural network. The system can determine how an optimal display can be produced 615. A request can be stored for a hotel at a specific location, such as by a user request 620, which can be a real-time request for a hotel at a specific location. A candidate list of hotels in the vicinity of the location can be determined 621. This could, for example, be hotels less than 2 km from a location, or a certain number of hotels (e.g., 50) closest to the location (such as if there are not enough hotels within the 2 km). For each hotel h in the candidate set, a best display can be determined by which to sell the hotel to a traveller 622. This creates a list of displays, e.g., a list of vectors comprised of real values. Each of these displays can be multiplied by the overall probability to sell the hotel they are optimized to sell 623. These displays can be multiplied by the yield of the hotel that the display is attempting to sell 624. In turn, the displays can be summed 625. From this sum, x number of largest values can be selected 626. These values can correspond to an optimal display by which to produce an optimal display.

Figure 7:
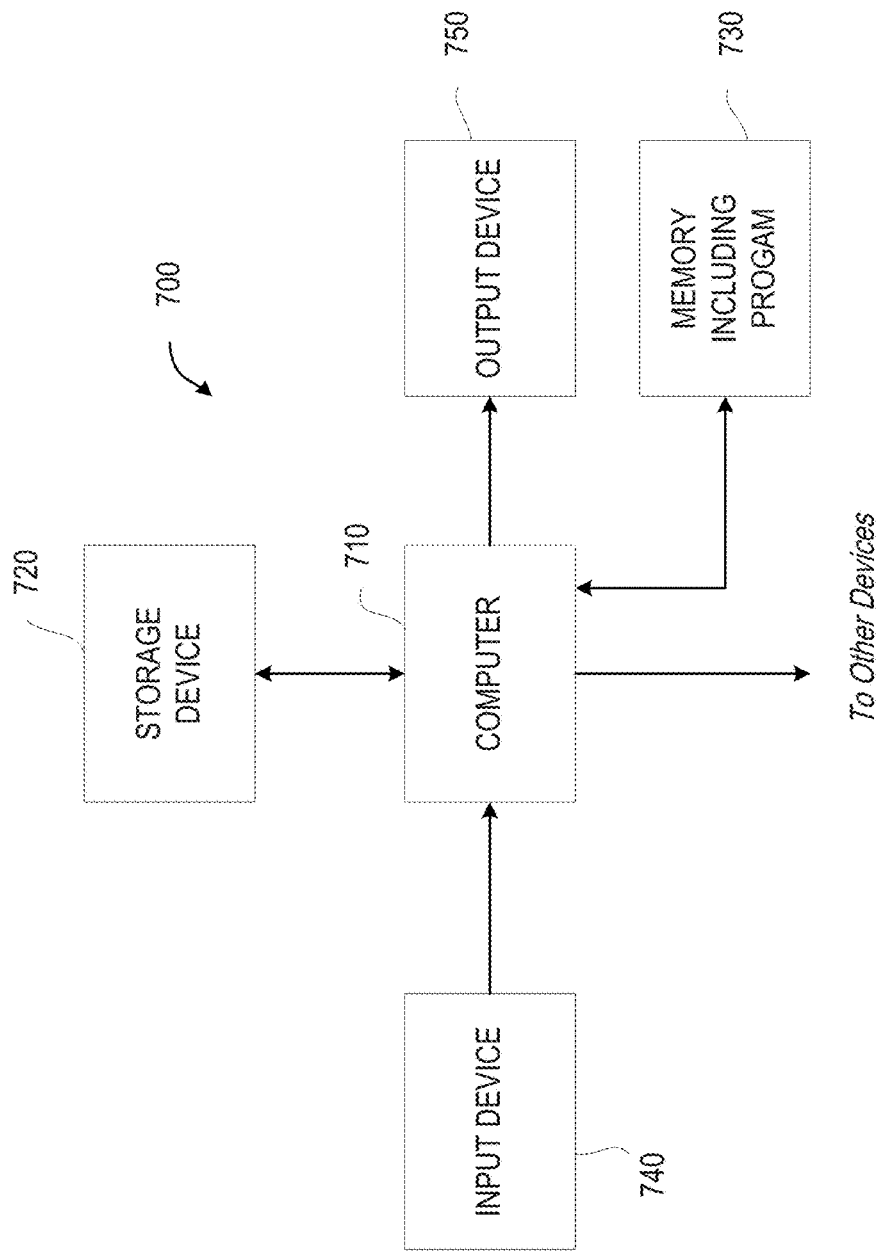
FIG. 7 illustrates an example functional architecture for a neural network for the optimal display of hotels on a user interface.

FIG. 7 illustrates a computer system 700 for implementing a neural network for the optimal display of hotels according to various embodiments. Computer 710 may contain or be operatively associated with a processor(s), and with memory(ies) including storage device 720 and memory 730, which also may include software applications. An input device 740, such as a keyboard, can be used to enter inputs into, and exercises control of, computer 710 and components associated therewith. There may be multiple computers operatively associated with computer 710 and its associated components. There may be an output device 750 such as a monitor screen, computer-to-computer communication device (e.g., modem), and/or a printer. In an embodiment, non-transitory computer readable media or memory 730 are provided. The computer-readable media or memory can tangibly embody a program of instructions executable by the computer system to carry out operations as described herein.

While various details have been set forth in the foregoing description, it will be appreciated that the various aspects may be practiced without these specific details. For example, for conciseness and clarity selected aspects may have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art.

Reference to "one aspect," "an aspect," "one embodiment," or "an embodiment" means that a particular method, feature, structure, or characteristic described in connection with the aspect is included in at least one aspect. Thus, appearances of the phrases "in one aspect," "in an aspect," "in one embodiment," or "in an embodiment" in various places throughout the specification are not necessarily all referring to the same aspect. Furthermore, the particular methods, features, structures or characteristics may be combined in any suitable manner in one or more aspects.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the claims are intended to cover all such modifications and variations as falling within the scope of the disclosed embodiments.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

One skilled in the art will recognize that the herein described methods, systems, components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedia components. Likewise, any two components so associated can also be viewed as being "in operative communication", "operably connected," or the like to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the claims, are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

With respect to the claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other adjectives are generally not intended to exclude such variants, unless context dictates otherwise.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the claims are intended to cover all such modifications and variations as falling within the scope of the disclosed embodiments. The claims are intended to cover all such modifications and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated.

What is claimed is:

1. A system for implementing a neural network for optimal display of hotels on a user interface, the system comprising at least one processor and a memory storing computer program instructions which when executed by the at least one processor cause the at least one processor to perform operations comprising:

storing a neural network having an input layer, a hidden layer, and an output layer, wherein the input layer comprises hotel neurons representing at least one hotel, and traveller neurons representing at least one traveller, the hidden layer comprises a plurality of neurons, and receives a first value from the input layer, and the output layer comprises display neurons representing at least one display, and receives a second value from the hidden layer;

presenting a training dataset to the neural network, the training dataset comprising travel data;

presenting a testing dataset after introduction of the training dataset, the testing dataset testing the performance and accuracy of the neural network;

determining, by the neural network, a combination of hotels to display to maximize a probability that a given hotel will be selected by a traveller, the combination of hotels to display determined by:

receiving a request by a traveller to book a hotel at a location;

determining a candidate set of hotels $h_1$, $h_2$, and $h_3$, in a vicinity of the location;

determining a past purchase decision percentage by the traveller for each of a first paired combination $h_1$ and $h_2$, a second paired combination $h_1$ and $h_3$, and a third paired combination $h_2$ and $h_3$, each respective past purchase decision percentage based on a prior booking choice of the traveller when presented with a first display having the first paired combination, a second display having the second paired combination, and a third display having the third paired combination;

determining objective point totals, based on employer preference, comprising (i) a first objective point total for hotel $h_1$, (ii) a second objective point total for hotel $h_2$, and (iii) a third objective point total for hotel $h_3$;

determining expected objective point totals, comprising:

(i) for the first paired combination, a first expected objective point total comprising a first sum of (a) the past purchase decision percentage of $h_1$ multiplied by the objective point total of $h_1$, (b) the past purchase decision percentage of $h_2$ multiplied by the objective point total of $h_2$, and (c) the past purchase decision percentage of $h_3$ multiplied by the objective point total of $h_3$;

(ii) for the second paired combination, a second expected objective point total comprising a second sum of (a) the past purchase decision percentage of $h_1$ multiplied by the objective point total of $h_1$, (b) the past purchase decision percentage of $h_2$ multiplied by the objective point total of $h_2$, and (c) the past purchase decision percentage of $h_3$ multiplied by the objective point total of $h_3$;

(iii) for the third paired combination, a third expected objective point total comprising a third sum of (a) the past purchase decision percentage of $h_1$ multiplied by the objective point total of $h_1$, (b) the past purchase decision percentage of $h_2$ multiplied by the objective point total of $h_2$, and (c) the past purchase decision percentage of $h_3$ multiplied by the objective point total of $h_3$; and displaying to the traveller the paired combination having a highest expected objective point total.

\* \* \* \* \*